UNITED STATES PATENT OFFICE.

EUGENE MORITZ, OF NEW YORK, N. Y., ASSIGNOR OF ONE-FOURTH TO PAUL VONDRANN, OF NEW YORK, N. Y.

FLOORING COMPOSITION.

1,097,986.      Specification of Letters Patent.      Patented May 26, 1914.

No Drawing.      Application filed January 28, 1913. Serial No. 744,705.

*To all whom it may concern:*

Be it known that I, EUGENE MORITZ, a subject of the Emperor of Germany, residing at New York city, in the county of New York and State of New York, have invented certain new and useful Improvements in Flooring Compositions, of which the following is a specification.

My invention relates to compositions for making floorings and has for its principal object the provision of a flooring composition that is reasonable in cost to manufacture, that forms a flooring that is very durable, is ornamental, and furthermore, one in which the flooring is elastic and sound-deadening, and at the same time is a non-conductor of cold.

Another object of my invention is the provision of a flooring that is capable of utilizing scrap leather that is added in the shape of shavings, said leather forming a binder for the other ingredients, as well as giving elasticity to the flooring when laid and preventing to a large extent the sound from walking over the floor.

In making my improved flooring composition, I take the following ingredients in the proportions stated, viz: burned magnesite 13¼ lbs., leather shavings 3⅓ lbs., fine sawdust 2½ lbs., shredded asbestos 1 lb., powdered talcum 1 lb., and dry coloring matter 2 lbs. These ingredients are mixed in a dry state thoroughly and after being mixed I add a solution of chlorid of magnesium of 25° Baumé in approximately the proportions of 35 pounds of the dry mixture to 30 pounds of the solution by weight.

When the dry ingredients have been mixed with the solution as above stated to a paste, the composition is spread upon the floor to the thickness desired and after being rubbed smooth by any suitable tools is permitted to dry. After the floor has dried the surface presented will be ornamental and the floor will as stated above be durable and elastic and prevent the passage of the cold therethrough and also successfully deaden the sounds incident to walking over the floor.

Having thus described my invention what I claim is:—

A plastic flooring composition composed of the following materials, in substantially the proportions indicated: burned magnesite 13¼ lbs., leather shavings 3⅓ lbs., fine sawdust 2½ lbs., shredded asbestos 1 lb., powdered talcum 1 lb., dry coloring matter 2 lbs., solution of chlorid of magnesium, approximately, by weight 19 lbs.

In testimony whereof I affix my signature in presence of two witnesses.

EUGENE MORITZ.

Witnesses:
     ELLA CURRY,
     PAUL VONDRANN.